US008824350B2

(12) United States Patent
Zhang et al.

(10) Patent No.: US 8,824,350 B2
(45) Date of Patent: Sep. 2, 2014

(54) CHANNEL SYNCHRONIZATION METHOD, SYSTEM AND DEVICE IN MULTICAST BROADCAST SINGLE FREQUENCY NETWORK

(75) Inventors: Dajun Zhang, Beijing (CN); Xiaodong Yang, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 252 days.

(21) Appl. No.: 13/320,442

(22) PCT Filed: May 13, 2010

(86) PCT No.: PCT/CN2010/072717
§ 371 (c)(1),
(2), (4) Date: Dec. 22, 2011

(87) PCT Pub. No.: WO2010/130215
PCT Pub. Date: Nov. 18, 2010

(65) Prior Publication Data
US 2012/0134314 A1    May 31, 2012

(30) Foreign Application Priority Data
May 15, 2009    (CN) .......................... 2009 1 0084299

(51) Int. Cl.
H04H 20/71    (2008.01)
H04W 72/00    (2009.01)
H04W 48/12    (2009.01)
H04L 12/18    (2006.01)

(52) U.S. Cl.
CPC ............ *H04W 72/005* (2013.01); *H04W 48/12* (2013.01); *H04L 12/189* (2013.01)
USPC ....................................... 370/312

(58) Field of Classification Search
None
See application file for complete search history.

(56) References Cited

U.S. PATENT DOCUMENTS 8,489,103 B2 *    7/2013  Chun et al. .................. 455/450
2008/0101270 A1 *  5/2008  Kekki et al. ................. 370/312
(Continued)

FOREIGN PATENT DOCUMENTS

CN       138 2329       11/2002
CN       101 043 265     9/2007

OTHER PUBLICATIONS

ZTE: "Consideration on MBSFN support", 3GPP Draft; R3-081642, 3rd Generation Partnership Project (3GPP), vol. RAN WG3, Jun. 9, 2008, entire document.*

(Continued)

*Primary Examiner* — Suk Jin Kang
(74) *Attorney, Agent, or Firm* — Fay Kaplun & Marcin, LLP

(57) ABSTRACT

A channel synchronization method, system and device in the multicast broadcast single frequency network are disclosed, which relate to wireless communication filed and are used to solve the problem of unable to ensure the base station to synchronously send the multi-points control channel (MCCH) message in the multicast broadcast single frequency network (MBSFN) region in the prior art. The specific scheme is: the network device in the MBSFN obtains multimedia broadcast multicast service (MBMS) service information and confirms the time resource and the frequency resource that bears MBMS service information. The network device sends the MBMS service information, the time resource and the frequency resource information to the base station in the MBSFN. The base station utilizing the time resource and the frequency resource sends the MBMS service information to the terminal via MBMS point to MCCH. Consequently the purpose that the base station synchronously sends the MBMS service message in the MBSFN is achieved.

16 Claims, 6 Drawing Sheets

(56) References Cited

U.S. PATENT DOCUMENTS

| | | | |
|---|---|---|---|
| 2008/0267109 A1* | 10/2008 | Wang et al. | 370/312 |
| 2008/0274759 A1* | 11/2008 | Chen et al. | 455/507 |
| 2009/0046617 A1* | 2/2009 | Tenny et al. | 370/312 |
| 2009/0201854 A1* | 8/2009 | Roger | 370/328 |
| 2009/0323574 A1* | 12/2009 | Koskinen et al. | 370/312 |
| 2010/0014450 A1* | 1/2010 | Chun et al. | 370/312 |
| 2010/0103854 A1* | 4/2010 | Lee et al. | 370/312 |
| 2010/0128646 A1* | 5/2010 | Gao | 370/312 |
| 2010/0178895 A1* | 7/2010 | Maeda et al. | 455/404.1 |
| 2010/0232340 A1* | 9/2010 | Godor et al. | 370/312 |
| 2010/0265867 A1* | 10/2010 | Becker et al. | 370/312 |
| 2010/0272001 A1* | 10/2010 | Lee et al. | 370/312 |
| 2010/0272004 A1* | 10/2010 | Maeda et al. | 370/312 |
| 2010/0315988 A1* | 12/2010 | Chen | 370/312 |
| 2011/0021224 A1* | 1/2011 | Koskinen et al. | 455/507 |
| 2011/0044225 A1* | 2/2011 | Rinne et al. | 370/312 |
| 2011/0058513 A1* | 3/2011 | Ai et al. | 370/312 |
| 2011/0070905 A1* | 3/2011 | Kazmi et al. | 455/507 |
| 2011/0085488 A1* | 4/2011 | Widegren | 370/312 |
| 2011/0194428 A1* | 8/2011 | Wang et al. | 370/252 |
| 2011/0199973 A1* | 8/2011 | Li et al. | 370/328 |
| 2011/0261751 A1* | 10/2011 | Ode et al. | 370/315 |
| 2012/0044851 A1* | 2/2012 | Wang et al. | 370/312 |
| 2012/0195221 A1* | 8/2012 | Wang et al. | 370/252 |

OTHER PUBLICATIONS

Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8), ETSI Standard, vol. 3-R2, No. V8.5.0, May 2008, entire document.*

* cited by examiner

CHANNEL SYNCHRONIZATION METHOD, SYSTEM AND DEVICE IN MULTICAST BROADCAST SINGLE FREQUENCY NETWORK

This application is a US National Stage of International Application No. PCT/CN2010/072717, filed May 13, 2010, designating the United States, and claiming the benefit of Chinese Patent Application No. 200910084299.2, filed with the Chinese Patent Office on May 15, 2009 and entitled "A Channel Synchronization Method, System and Device in a Multicast Single Frequency Network", both of which are hereby incorporated by reference in their entirety.

FIELD

The present invention relates to the field of radio communications and particularly to a channel synchronization method, system and device in a multicast single frequency network.

BACKGROUND

A Multimedia Broadcast and Multicast Service (MBMS) can provide a user in a radio cell with a multimedia broadcast and multicast service. In a Long Term Evolution (LTE) system, an MBMS can be provided at both an MBMS-specific frequency layer and a frequency layer shared between an MBMS service and a non-MBMS service. An MBMS-enabled LTE cell may be an MBMS-specific cell or a hybrid MBMS/uni-cast cell. An MBMS service can be transmitted in a single cell or in a plurality of cells.

An MBMS-specific frequency layer refers to a frequency layer dedicated to transmission of an MBMS. When a cell is configured as an MBMS-specific frequency layer, the cell is referred to as an MBMS-specific cell; and when a cell is configured as a frequency layer which is not dedicated to transmission of an MBMS, the cell is referred to as a hybrid MBMS/uni-cast cell in which transmission of uni-cast and MBMS services is coordinated so that an MBMS service is transmitted at some times and a uni-cast service is transmitted at other times. Transmission of an MBMS in a single cell refers to transmission of the MBMS only in the coverage area of a specified cell without any support of MBMS transmission in a plurality of cells in combination, and transmission of an MBMS in plurality of cells requires a support of a transmission mode of Multi Broadcast Single Frequency Network (MBSFN).

The MBSFN refers to synchronous transmission ongoing concurrently in a plurality of cells at the same frequency. The use of this transmission mode can save a resource of frequencies and improve a spectrum utilization ratio. It requires concurrent transmission of the same contents in a plurality of cells. Thus, a receiver of a UE can regard the plurality of MBSFN cells as a large cell. Therefore the UE will both be free of inter-cell interference resulting from transmission in an adjacent cell and benefit from superposition of signals from the plurality of MBSFN cells. The MBSFN transmission mode can be adopted in both an MBMS-specific cell and a hybrid MBMS/uni-cast cell. Furthermore the use of an advanced UE receiver technology can also address the problem of a time difference due to multi-path propagation and hence remove intra-cell interference. A diversity effect resulting from such transmission in a plurality of cells at the same frequency can also address such a problem of covering a blind area, etc., and therefore enhance the reliability of reception and improve a coverage ratio.

Technical characteristics of transmission in a plurality of MBMS cells are as follows.

Firstly synchronous transmission of an MBMS is active in an MBSFN area;

Secondly combined transmission of an MBMS in the plurality of cells is supported;

Thirdly an MBMS point-to-multipoint Traffic Channel (MTCH) and an MBMS point-to-multipoint Control Channel (MCCH) are mapped onto a Multicast Channel (MCH) for Packet Temporary Mobile (PTM) transmission;

Fourthly an MBSFN area can be semi-statically configured, for example, by an Operation and Management (O&M) device, etc.

For transmission of an MBMS in a plurality of cells, a plurality of MCHs can be supported at a carrier frequency. A physical resource of an MCH can be allocated in a pattern of specifying a sub-frame for the MCH, and correlated sub-frames may not necessarily be temporally adjacent. This pattern is referred to as an MCH Sub-frame Allocation Pattern (MSAP). An MSAP of each MCH, over which an MTCH is carried, is signaled over an MCCH, and for an MCH onto which a plurality of MTCHs are mapped, the order in which the respective MTCHs is also signaled over an MCCH. Data of only one MBSFN area is involved over one MCH, but a plurality of MBMS services can be mapped onto each MCH.

The inventors have identified during making of the invention the following technical problem in the prior art:

as can be apparent from above, synchronous transmission of MCCH information in an MBSFN area has to also be ensured in an LTE system in addition to synchronous transmission of MBMS service in the MBSFN area because an MCCH is also mapped onto an MCH.

SUMMARY

Embodiments of the invention provide a channel synchronization method, system and device in a multicast single frequency network to address the problem in the prior art that synchronous transmission of MCCH information in an MBSFN area by base stations can not be guaranteed.

An embodiment of the invention provides a channel synchronization method in a multicast single frequency network, which includes:

a network device in the multicast single frequency network acquiring Multimedia

Broadcast and Multicast Service, MBMS, service information and determining time resources and a frequency resource over which the MBMS service information is borne;

the network device transmitting the MBMS service information and information on the time resources and the frequency resource to base stations in the multicast single frequency network; and the base stations in the multicast single frequency network transmitting the MBMS service information to a user equipment over an MBMS point-to-multipoint Control Channel, MCCH, over the time resources and the frequency resource.

An embodiment of the invention provides a channel synchronization system including:

a network device configured to acquire MBMS service information, to determine time resources and a frequency resource over which the MBMS service information is borne, and to transmit the MBMS service information and information on the time resources and the frequency resource to base stations in a multicast single frequency network; and the base stations configured to transmit the MBMS service information to a user equipment over an MCCH, over the time resources and the frequency resource.

An embodiment of the invention provides a network device including:

an information acquisition unit configured to acquire MBMS service information;

a resource determination unit configured to determine time resources and a frequency resource over which the MBMS service information is borne; and an information transmission unit configured to transmit the MBMS service information and information on the time frequencies and the frequency resource to base stations in a multicast single frequency network.

An embodiment of the invention provides a base station including:

an information reception unit configured to receive MBMS service information and information on time resources and a frequency resource over which the MBMS service information is borne, transmitted from a network device in a multicast single frequency network; and a message transmission unit configured to transmit the MEMS service information to a user equipment over an MCCH over the time resources and the frequency resource.

According to the invention, a network device in a multicast single frequency network transmits MBMS service information and information on time and frequency resources over which the MBMS service information is borne to base stations in the multicast single frequency network, and the respective base stations transmit the MBMS service information to a user equipment over the time and frequency resources, and since the respective base stations in the multicast single frequency network transmit the same MBMS service information over the same time and frequency resources notified from the network device, the respective base stations can transmit MCCH information synchronously.

DETAILED DESCRIPTION

In order to guarantee synchronous transmission of MCCH information in an MBSFN area by respective base stations, an embodiment of the invention provides a channel synchronization method in a multicast single frequency network, and in the present method, a network device in the multicast single frequency network transmits MBMS service information and information on resources, over which the MBMS service information is borne, to base stations in the multicast single frequency network, and the base stations transmit the MBMS service information over the resources, so that the respective stations transmit MCCH information synchronously.

Figure 1:
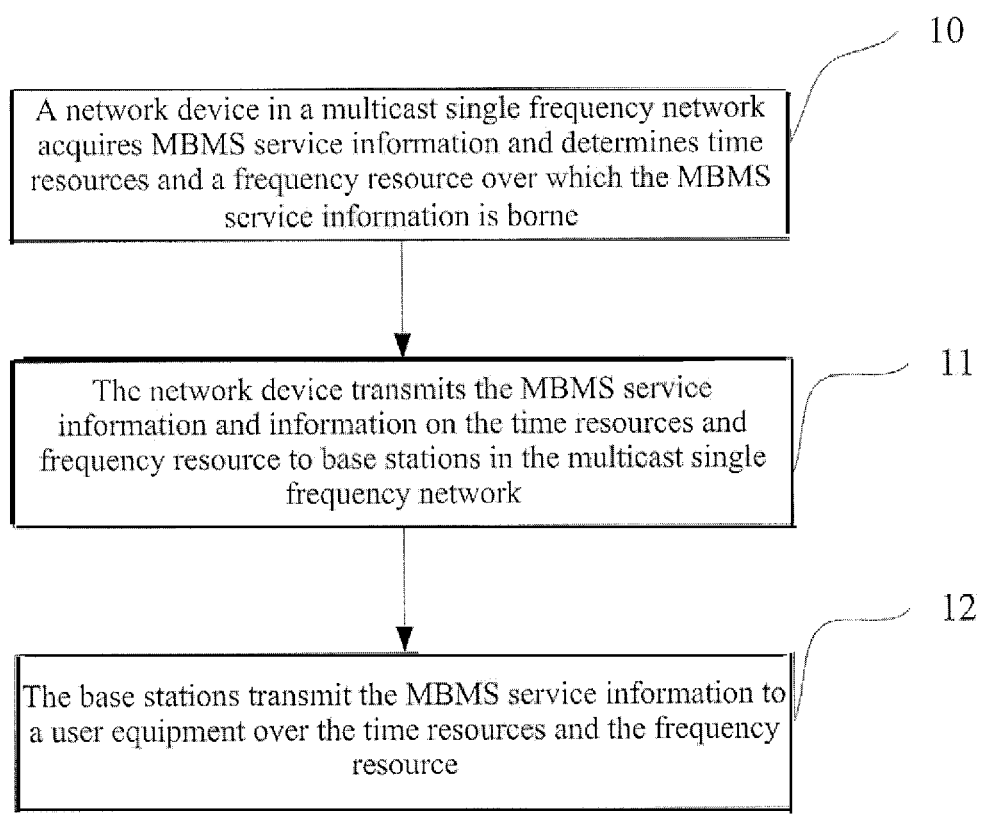
FIG. 1 is a schematic flow chart of a method according to an embodiment of the invention.

Referring to FIG. 1, a channel synchronization method in a multicast single frequency network according to an embodiment of the invention particularly includes the following operations 10 to 12.

Operation 10: a network device in the multicast single frequency network acquires MBMS service information and determines time resources and a frequency resource over which the MBMS service information is borne;

Operation 11: the network device transmits the acquired MBMS service information and information on the determined time resources and frequency resource to base stations in the multicast single frequency network; and Operation 12: the base stations in the multicast single frequency network transmit the MBMS service information to a user equipment over an MCCH over the time resources and the frequency resource.

The inventive method will be described below in connection with embodiments thereof.

First Embodiment

Figure 2A:
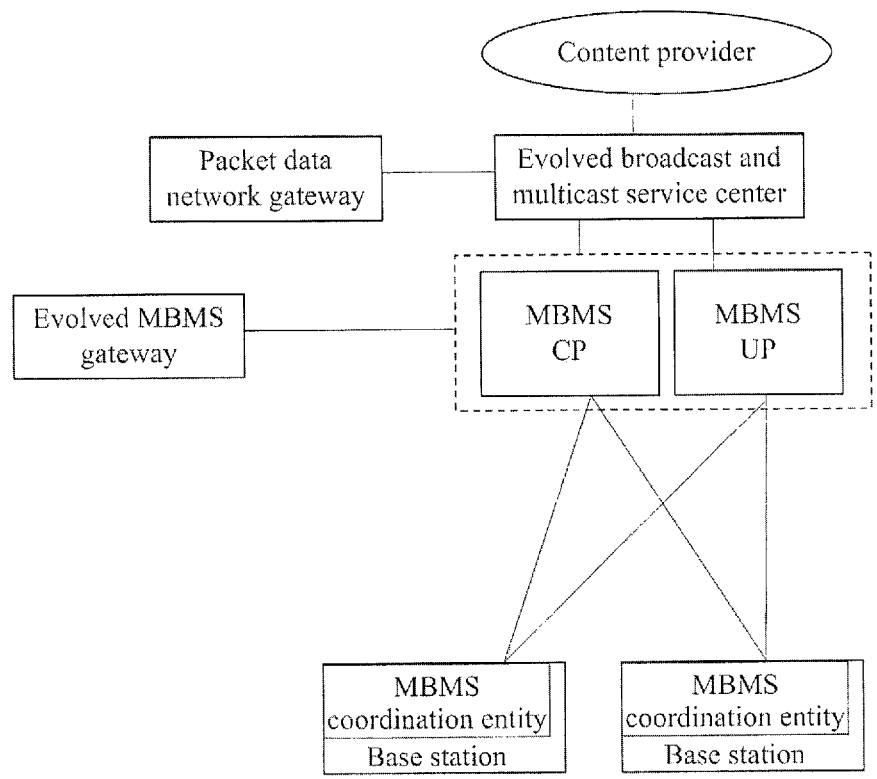
FIG. 2A is a schematic diagram of a networking structure according to a first embodiment of the invention.

As illustrated in FIG. 2A, the present embodiment can be applied in a scenario where an MBMS Coordination Entity, MCE, incorporated into a base station is deployed, where an O&M device determines one of the base stations in a multicast single frequency network as a primary base station, which transmits MBMS service information and resource information to the other base stations in the multicast single frequency network, particularly as follows:

Operation S01: the primary base station composes an MBSFN MCCH Information message upon reception of an MBMS session initiation message transmitted from a core network device (e.g., a Mobility Management Entity (MME), etc.) by extracting MBMS service information carried in the MBMS session initiation message, composing MCCH messages from the MBMS service information by carrying the MBMS service information in the MCCH messages, adding the MCCH messages to the MBSFN MCCH Information message, and also adding the identifier of the MBSFN area, time information and MCCH configuration information to the MBSFN MCCH Information message. The other base stations are in a ready status upon reception of the MBMS session initiation message. A specific format of the MBSFN MCCH Information message is as depicted in the table below:

| Type of Information | Description of Information |
| --- | --- |
| NBSFB Identity | The identifier of the MBSFN area |
| List of MCCH messages | The MCCH messages composed from the MBMS session initiation message |
| Time information | The times at which the MCCH messages are scheduled |
| MCCH configuration information | Physical resource configuration of an MCCH |

In the table above, the MBSFN identity can distinguish one MBSFN area from another; the MCCH messages in the list of MCCH messages are encoded by the primary base station into a message format that can be transmitted directly over an air interface, thus the other base stations can simply transmit the MCCH messages transparently; the time information can particularly include the frame number of a radio frame in which the MCCH messages are scheduled, etc.; and the MCCH configuration information can particularly include the sub-frame numbers of sub-frames in which the MCCH messages are scheduled or the sub-frame number of a starting sub-frame, the amount of sub-frames, in which the MCCH messages are scheduled, information on a frequency resource, information on a scheduling pattern, an MCCH scheduling repetition interval, etc., for scheduling, where the information on a scheduling pattern includes an encoding pattern, an encoding rate, etc., and the MCCH scheduling repetition interval refers to an interval of time at which the base stations transmit the MCCH messages to a user equipment in the multicast single frequency network.

The primary base station can determine the frame number and the sub-frame numbers as follows:

the amount of sub-frames required for transmission of the MBMS service information is determined from the amount of data of the MBMS service information; sub-frames of that amount of sub-frames are selected from sub-frames currently available to transmission of MCCH control information; and the selected sub-frames are determined as the time resources over which the MBMS service information is borne, and the sub-frame numbers of the selected sub-frames and the frame number of a radio frame in which the sub-frames reside are determined as the information on the time resources over which the MBMS service information is borne.

The primary base station can determine the frame number, the starting sub-frame number and the amount of sub-frames as follows:

the amount of sub-frames required for transmission of the MBMS service information is determined from the amount of data of the extracted MBMS service information; one sub-frame are selected from sub-frames currently available to transmission of MCCH control information as a starting sub-frame; and the sub-frame number of the selected starting sub-frame, the frame number of a radio frame where the sub-frame resides and the amount of sub-frames are determined as the time resources over which the MBMS service information is borne.

The primary base station can add the information on the frequency resource, the information on the scheduling pattern and the MCCH scheduling repetition interval, which are pre-configured, to the MBSFN MCCH Information message.

Operation S02: the primary base station transmits the MBSFN MCCH Information message to the other base stations in the multicast single frequency network via an X2 interface.

Operation S03: the primary base station and the other base stations receiving the MBSFN MCCH Information message transmit the MCCH messages carried in the MBSFN MCCH Information message to the user equipment over the MCCH according to the time information and the MCCH configuration information carried in the MBSFN MCCH Information message.

For example, when the time information carried in the MBSFN MCCH Information message includes the frame number and the sub-frame numbers, the base stations transmit the MCCH messages to the user equipment in the sub-frames corresponding to the sub-frame numbers in the radio frame corresponding to the frame number over the frequency resource carried in the MBSFN MCCH Information message. The MCCH messages may also be modulated according to the scheduling pattern information carried in the MBSFN MCCH Information message prior to transmission of the MCCH messages.

When the time information carried in the MBSFN MCCH Information message includes the frame number, the starting sub-frame number and the amount of sub-frames, the base stations select sub-frames of that amount of sub-frames starting from the starting sub-frame corresponding to the starting sub-frame number in the radio frame corresponding to the frame number and transmit the MCCH messages to the user equipment in the selected sub-frames over the frequency resource carried in the MBSFN MCCH Information message. The MCCH messages may also be modulated according to the scheduling pattern information carried in the MBSFN MCCH Information message prior to transmission of the MCCH messages.

Operation S04: the primary Evolved Node B, ENB, transmits to the other base stations in the MBSFN the MBSFN MCCH Information message with its contents necessarily modified due to a change to the MCCH configuration information, an MBMS service, etc., and then the operation S03 is repeated.

Operation S05: the other base stations than the primary base station in the MBSFN, upon another reception of the MBSFN MCCH Information message transmitted from the primary base station, each select a time resource closest to the current time and in the previously received MCCH scheduling repetition interval according to the information on the time resources carried in the MBSFN MCCH Information message and transmit the MCCH messages carried in the MBSFN MCCH Information message to the user equipment over the time resources.

The Second Embodiment

Figure 2B:
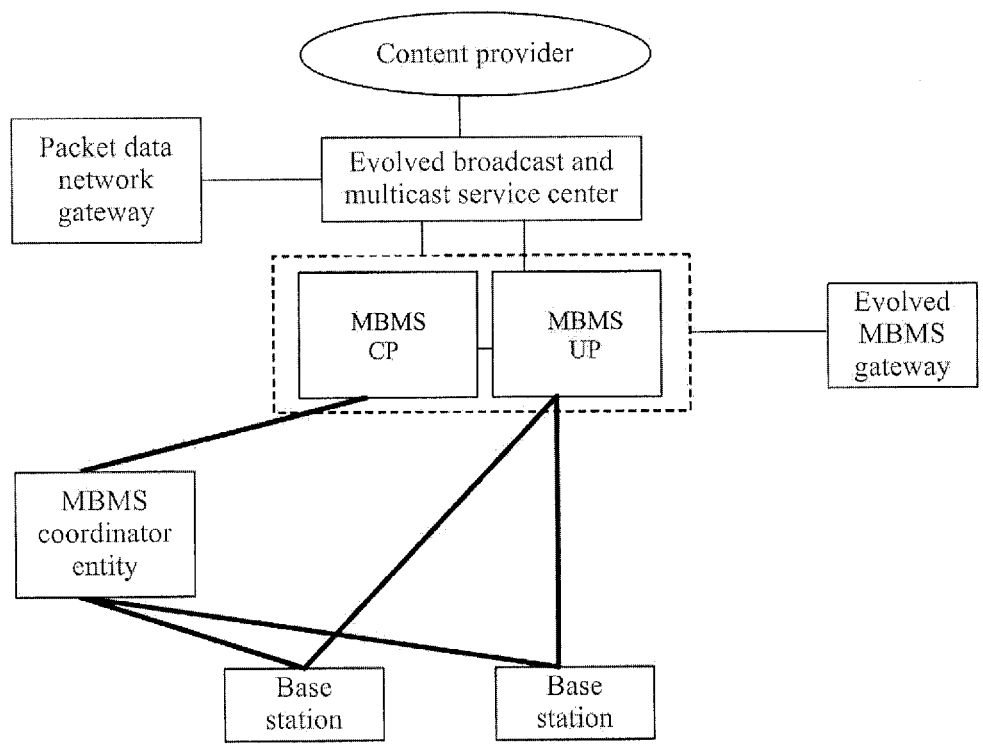
FIG. 2B is a schematic diagram of a networking structure according to a second embodiment of the invention.

As illustrated in FIG. 2B, the present embodiment can be applied in a scenario where an MBMS Coordination Entity, MCE, is deployed as a centralized control node, where the MCE transmits MBMS service information and resource information to base stations in a multicast single frequency network, particularly as follows:

Operation S11: the MCE composes an MBSFN MCH Information message upon reception of an MBMS session initiation message transmitted from a core network device (e.g., a Mobility Management Entity (MME), etc.) by extracting MBMS service information carried in the MBMS session initiation message, composing MCCH messages from the MBMS service information, adding the MCCH messages to the MBSFN MCH Information message by carrying the MBMS service information in the MCCH messages, and also adding the identifier of the MBSFN area, time information and MCCH configuration information to the MBSFN MCH Information message. A specific format of the MBSFN MCH Information message is as depicted in the table below:

| Type of Information | Description of Information |
| --- | --- |
| NBSFB Identity | The identifier of the MBSFN area |
| List of MCCH messages | The MCCH messages composed from the MBMS session initiation message |
| Time information | The times at which the MCCH messages are scheduled |
| MCCH configuration information | Physical resource configuration of an MCCH |

Reference can be made to the description in the first embodiment for specific contents and determination mode thereof of the MBSFN identity, the time information and the MCCH configuration information in the table above, and a repeated description thereof will be omitted here. The MCCH messages in the list of MCCH messages are encoded by the MCE into a message format that can be transmitted via the M2 interface, and therefore the base stations shall transmit the MCCH messages after encoding it into a message format that can be transmitted via an air interface.

Operation S12: the MCE transmits the MBSFN MCH Information message to the respective base stations in the multicast single frequency network via the M2 interface.

Operation S13: the base stations receiving the MBSFN MCH Information message transmit the MCCH messages carried in the received message to a user equipment over the MCCH according to the time information and the MCCH configuration information carried in the MBSFN MCH Information message, as described in the first embodiment.

Operation S14: the MCE transmits to the respective base stations in the MBSFN via the M2 interface the MBSFN MCH Information message with its contents necessarily modified due to a change to the MCCH configuration information, an MBMS service, etc., and then the operation S13 is repeated.

Operation S15: the base stations in the MBSFN, upon another reception of the MBSFN MCH Information message transmitted from the MCE, each select a time resource closest to the current time and in the previously received MCCH scheduling repetition interval according to the information on the time resources carried in the MBSFN MCH Information message and transmit the MCCH messages carried in the MBSFN MCH Information message to the user equipment over the time resources over the MCCH.

The Third Embodiment

In the present embodiment, an O&M device transmits MBMS service information and resource information to base stations in a multicast single frequency network, particularly as follows:

Operation S21: an operator configures MCCH information, including MBMS service information to be transmitted and information on resources over which the MBMS service information is borne, at the O&M device according to a network plan.

Operation S22: The O&M device transmits to the base stations in the multicast single frequency network a message carrying the configured MBMS service information and information on the resources, such as time and frequency resources, over which the MBMS service information is borne, and the message may specifically be the MBSFN MCCH Information message in the first embodiment or the MBSFN MCH Information message and the second embodiment.

Operation S23: the base stations transmit MCCH messages carrying the MBMS service information to a user equipment according to the resource information carried in the received message, as described in the first embodiment.

Operation S24: the O&M device transmits to the respective base stations in the MBSFN via the M2 interface the message with its contents modified due to a change to the MCCH configuration information, an MBMS service, etc., and then the operation S23 is repeated.

Figure 3:
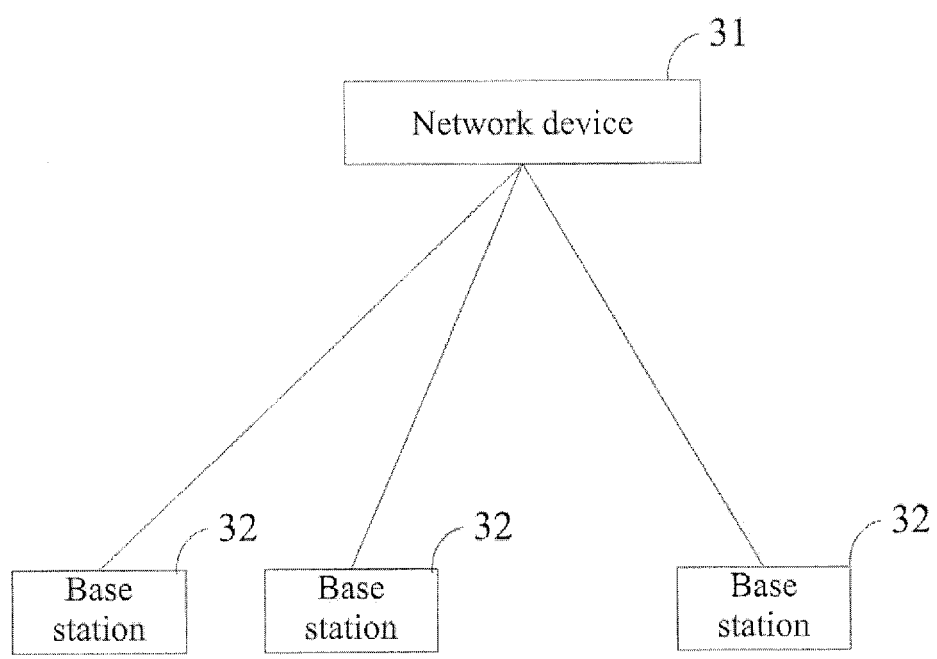
FIG. 3 is a schematic diagram of the structure of a system according to an embodiment of the invention.

Referring to FIG. 3, an embodiment of the invention further provides a channel synchronization system including:

a network device 31 configured to acquire MBMS service information, to determine time resources and a frequency resource over which the MBMS service information is borne, and to transmit the MBMS service information and information on the time resources and the frequency resource to base stations in a multicast single frequency network over an MCCH; and the base stations 32 configured to transmit the MBMS service information to a user equipment over the time resources and the frequency resource.

If the network device 31 is a primary base station in the multicast single frequency network, then the primary base station is configured:

to receive an MBMS session initiation message transmitted from a core network device, to extract the MBMS service information carried in the MBMS session initiation message, and to transmit the MBMS service information and the information on physical resources to the other base stations than the primary base station in the multicast single frequency network.

If the network device 31 is an MBMS Coordinator Entity (MCE), then the MCE is configured:

to receive an MBMS session initiation message transmitted from a core network device, to extract the MBMS service information carried in the MBMS session initiation message, and to transmit the MBMS service information and the information on physical resources to the respective base stations in the multicast single frequency network.

If the network device 31 is an Operation and Management (O&M) entity, the O&M entity is configured:

to search in stored MCCH configuration information for the MBMS service information, and to transmit the MBMS service information and the information on physical resources to the respective base stations in the multicast single frequency network.

The network device 31 is configured to determine from the amount of data carried in the MBMS service information the amount of sub-frames required for transmission of the MBMS service information, to select sub-frames of that amount of sub-frames from sub-frames currently available to transmission of MCCH control information, and to determine the selected sub-frames as the time resources over which the MBMS service information is borne; and correspondingly the base stations 32 are configured to transmit the MBMS service information to the user equipment over the selected sub-frames.

The network device 31 is configured to determine from the amount of data carried in the MBMS service information the amount of sub-frames required for transmission of the MBMS service information, to select one of sub-frames currently available to transmission of MCCH control information as a starting sub-frame, and to determine the sub-frame number of the selected starting sub-frame, the frame number of a radio frame where the sub-frame resides and the amount of sub-frames as the time resources over which the MBMS service information is borne; and correspondingly the base stations 32 are configured to select sub-frames of the amount of sub-frames starting from the sub-frame corresponding to the starting sub-frame number in the radio frame corresponding to the frame number and to transmit the MBMS service information in the selected sub-frames.

The network device 31 is further configured to transmit information on an MCCH scheduling repetition interval to the base stations.

The base stations 32 each are further configured to, after transmitting the MBMS service information to the user equipment over the time resources and the frequency resource and upon reception of the MBMS service information and the information on the time resources transmitted again from the network device, select a sub-frame closest to the current time and in the MCCH scheduling repetition interval according to the information on the time resources and transmit in the sub-frame the MBMS service information received again.

The network device 31 is further configured to determine an MCCH message modulation pattern and to transmit information on the MCCH message modulation pattern to the base stations; and the base stations 32 are configured to transmit the MBMS service information to the user equipment in the MCCH message modulation pattern.

Figure 4:
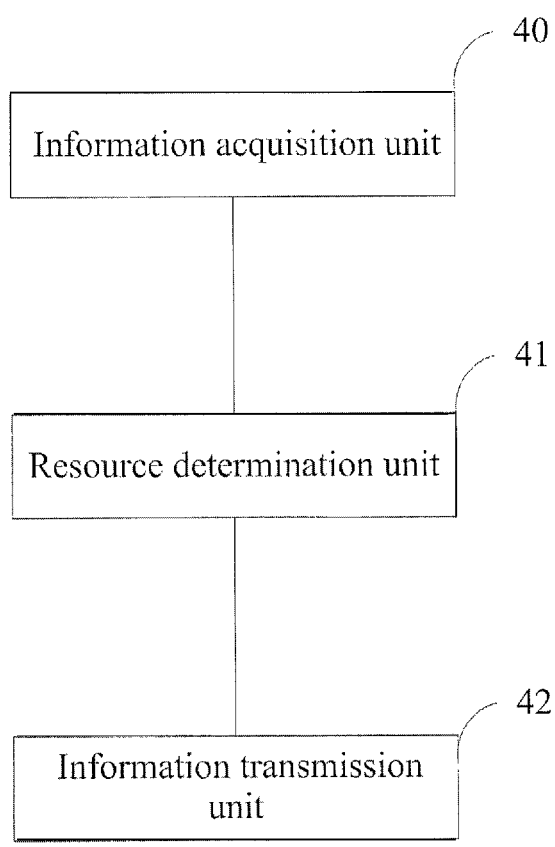
FIG. 4 is a schematic diagram of the structure of a device according to an embodiment of the invention.

Referring to FIG. 4, an embodiment of the invention further provides a network device applicable to a channel synchronization system, and the device includes:

an information acquisition unit 40 configured to acquire MBMS service information;

a resource determination unit 41 configured to determine time resources and a frequency resource over which the MBMS service information is borne; and an information transmission unit 42 configured to transmit the MBMS service information and information on the time frequencies and the frequency resource to base stations in a multicast single frequency network over an MCCH.

The information acquisition unit 40 includes:
a reception unit configured to receive an MBMS session initiation message transmitted from a core network device; and
an extraction unit configured to extract the MBMS service information carried in the MBMS session initiation message.

The information acquisition unit 40 includes:
a storage unit configured to store configured MCCH configuration information; and
a search unit configured to search the storage unit for the MBMS service information.

The resource determination unit 41 includes:
a determination unit configured to determine from the amount of data carried in the MBMS service information the amount of sub-frames required for transmission of the MBMS service information; and
a selection unit configured to select sub-frames of the amount of sub-frames from sub-frames currently available to transmission of MCCH control information and to determine the selected sub-frames as the time resources over which the MBMS service information is borne; or to select one of sub-frames currently available to transmission of MCCH control information as a starting sub-frame and to determine the sub-frame number of the selected starting sub-frame, the radio number of a radio frame where the starting sub-frame resides and the amount of the sub-frames as the time resources over which the MBMS service information is borne.

The information transmission unit 42 is further configured:
to transmit information on an MCCH scheduling repetition interval and/or information on an MCCH message modulation pattern to the base stations.

Figure 5:
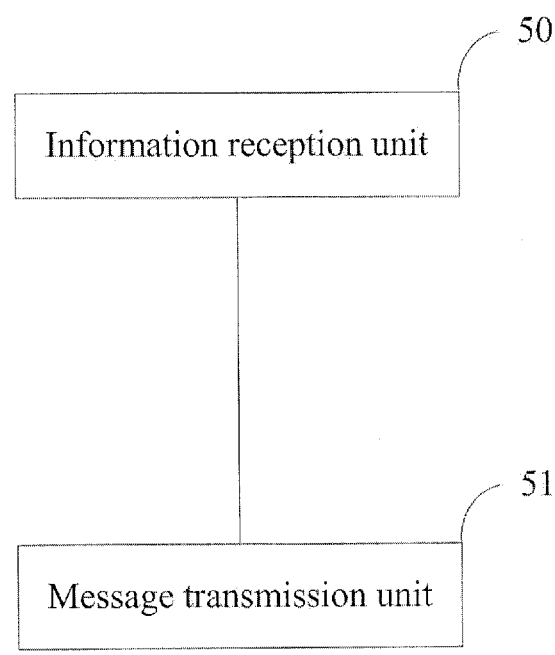
FIG. 5 is a schematic diagram of the structure of a device according to an embodiment of the invention.

Referring to FIG. 5, an embodiment of the invention further provides a base station applicable to a channel synchronization system, and the base station includes:
an information reception unit 50 configured to receive MBMS service information and information on time resources and a frequency resource over which the MEMS service information is borne, transmitted from a network device in a multicast single frequency network; and
a message transmission unit 51 configured to transmit the MBMS service information to a user equipment over the time resources and the frequency resource.

The information reception unit 50 is further configured to receive information on an MCCH scheduling repetition interval transmitted from the network device and to receive the MBMS service information and the information on the time resources transmitted again from the network device; and the message transmission unit 51 is further configured to select a sub-frame closest to the current time and in the MCCH scheduling repetition interval according to the information on the time resources and to transmit in the sub-frame the MBMS service information received again.

The information reception unit 50 is further configured to receive information on an MCCH message modulation pattern transmitted from the network device; and the message transmission unit 51 is further configured to transmit the MBMS service information to the user equipment in the MCCH message modulation pattern.

It shall be noted that the invention can be applied to both a Time Division Duplex (TDD) system and a Frequency Division Duplex (FDD) system. Furthermore a network device in the invention can alternatively be any other network device than a primary base station, an MCE and an O&M device, which is provided with a communication interface with base stations in an MBSFN.

In summary the invention offers the following advantageous effect:
in the solution according to the embodiments of the invention, a network device in a multicast single frequency network transmits MBMS service information and information on resources over which the MBMS service information is borne to base stations in the multicast single frequency network, and the respective base stations transmit the MBMS service information to a user equipment over the resources, and since the respective base stations in the multicast single frequency network transmit the same MBMS service information over the same resources signaled from the network device, the respective base stations can transmit MCCH information synchronously.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A channel synchronization method in a Multi Broadcast Single Frequency Network (MBSFN), comprising:
a network device in the MBSFN acquiring Multimedia Broadcast and Multicast Service (MBMS) service information including an MBMS point-to-multipoint Control Channel (MCCH) message from the MBMS service information, the network device adding the MCCH message, information on time at which the MCCH message is transmitted by base stations in the MBSFN to user equipments, and MCCH configuration information to one of a MBSFN MCCH Information message and a MBSFN Multicast Channel (MCH) Information message, wherein the MBMS service information is carried in the MCCH message, and the MCCH configuration information comprises an MCCH scheduling repetition interval and/or information on an MCCH message modulation pattern;
the network device transmitting the one of the MBSFN MCCH Information message and the MBSFN MCH Information message to the base stations in the MBSFN via an interface; and
the base stations in the MBSFN transmitting one of the MCCH message carried in the MBSFN MCCH Information message and the MBSFN MCH Information message to the user equipments over a MCCH according to the information on time and the MCCH configuration information.

2. The method of claim 1, wherein if the network device is an MBMS Coordinator Entity (MCE), then the network device acquiring the MBMS service information comprises:
the MCE receiving an MBMS session initiation message transmitted from a core network device and extracting the MBMS service information carried in the MBMS session initiation message; and
the network device transmitting the MBSFN MCH Information message to the base stations in the MBSFN via the interface comprises:
the MCE transmitting the MBSFN MCH Information message to the respective base stations in the MBSFN via the interface.

3. The method of claim 1, wherein if the network device is a primary base station in the MBSFN, then the network device acquiring the MBMS service information comprises:
the primary base station receiving an MBMS session initiation message transmitted from a core network device and extracting the MBMS service information carried in the MBMS session initiation message; and
the network device transmitting the MBSFN MCCH Information message to the base stations in the MBSFN via the interface comprises:
the primary base station transmitting the MBSFN MCCH Information message to the others base stations than the primary base station in the MBSFN via the interface.

4. The method of claim 1, wherein if the network device is an Operation and Management (O&M) entity, then the network device acquiring the MBMS service information comprises:
the O&M entity searching stored MCCH configuration information for the MBMS service information; and
the network device transmitting the MBSFN MCCH Information message and the MBSFN MCH Information message to the base stations in the MBSFN via the interface comprises:
the O&M entity transmitting one of the MBSFN MCCH Information message and the MBSFN MCH Information message to the respective base stations in the MBSFN via the interface.

5. The method of claim 1, wherein the information on time comprises a frame number of a radio frame in which the MCCH message is scheduled.

6. The method of claim 1, wherein when the MCCH configuration information comprises the MCCH scheduling repetition interval,
the base stations, after transmitting the MCCH message to the user equipments and upon reception of one of the MBSFN MCCH Information message and the MBSFN MCH Information message transmitted again from the network device, each selects a time resource closest to the current time and in the MCCH scheduling repetition interval according to the information on time carried in one of the MBSFN MCCH Information and the MBSFN MCH Information message received again and transmits a further MCCH message carried in one of the MBSFN MCCH Information message and the MBSFN MCH Information message received again to the user equipments over the time resource.

7. The method of claim 1, wherein when the MCCH configuration information comprises the information on a MCCH message modulation pattern,
the base stations modulate the MCCH message according to the MCCH message modulation pattern prior to transmission of the MCCH message.

8. A network device, comprising:
an information acquisition unit configured to acquire Multimedia Broadcast and Multicast Service (MBMS) service information;
a resource determination unit configured to compose a MBMS point-multipoint Control Channel (MCCH) message from the MBMS service information, the resource determination unit configured to add the MCCH message, information on time at which the MCCH message is transmitted by base stations in an MBSFN to user equipments, and MCCH configuration information to one of a Multi Broadcast Single Frequency Network (MBSFN) MCCH Information message and a MBSFN Multicast Channel (MCH) Information message, wherein the MBMS service information is carried in the MCCH message, and the MCCH configuration information comprises an MCCH scheduling repetition interval and/or information on an MCCH message modulation pattern; and
an information transmission unit configured to transmit one of the MBSFN MCCH Information message and the MBSFN MCH Information message to the base stations in the MBSFN via an interface so that the base stations in the MBSFN transmit the MCCH message carried in one of the MBSFN MCCH Information message and the MBSFN MCH Information message to the user equipments over an MCCH according to the information on time and the MCCH configuration information.

9. The network device of claim 8, wherein the information acquisition unit comprises
a reception unit configured to receive an MBMS session initiation message transmitted from a core network device; and
an extraction unit configured to extract the MBMS service information carried in the MBMS session initiation message.

10. The network device of claim 8, wherein the information acquisition unit comprises:
a storage unit configured to store configured MCCH configuration information; and
a search unit configured to search the storage unit for the MBMS service information.

11. The network device of claim 8, wherein the information on time comprises a frame number of a radio frame in which the MCCH message is scheduled.

12. The network device of claim 9, wherein the information on time comprises a frame number of a radio frame in which the MCCH message is scheduled.

13. The network device of claim 10, wherein the information on time comprises a frame number of a radio frame in which the MCCH message is scheduled.

14. A base station, comprising:
an information reception unit configured to receive one of a Multi Broadcast Single Frequency Network (MBSFN) Multimedia Broadcast and Multicast Service (MBMS) point-to-multipoint Control Channel (MCCH) information message and a MBSFN Multicast Channel (MCH) Information message transmitted from a network device in a MBSFN where the base station resides, wherein one of the MBSFN MCCH Information message and the MBSFN MCH Information message carries an MCCH message, information on time at which the MCCH message is transmitted by base stations in the MBSFN to user equipments, and MCCH configuration information, wherein the MCCH configuration information comprises an MCCH scheduling repetition interval and/or information on an MCCH message modulation pattern; and
a message transmission unit configured to transmit one of the MCCH message carried in the MBSFN MCCH Information message and the MBSFN MCH Information message to a user equipment over an MCCH according to the information on time and the MCCH configuration information.

15. The base station of claim 14, wherein when the MCCH configuration information comprises the MCCH scheduling repetition interval, and after the message transmission unit transmits the MCCH message, the information reception unit is further configured:
to receive one of the MBSFN MCCH Information message and the MBSFN MCH Information message transmitted again from the network device; and the message transmission unit is further configured:
to select a time resource closest to the current time and in the MCCH scheduling repetition interval according to the information on time carried in one of the MBSFN MCCH Information message and the MBSFN MCH Information message received again and to transmit a further MCCH message carried in one of the MBSFN MCCH Information message and the MBSFN MCH Information message received again to the user equipment over the time resource.

16. The base station of claim 14, wherein when the MCCH configuration information comprises the information on a MCCH message modulation pattern,
the message transmission unit is further configured:
to modulate the MCCH message according to the MCCH message modulation pattern prior to transmission of the MCCH message.

* * * * *